June 23, 1925.
O. BROWNSEY
HOLDER FOR SLICING MACHINES
Filed May 9, 1921
1,543,317
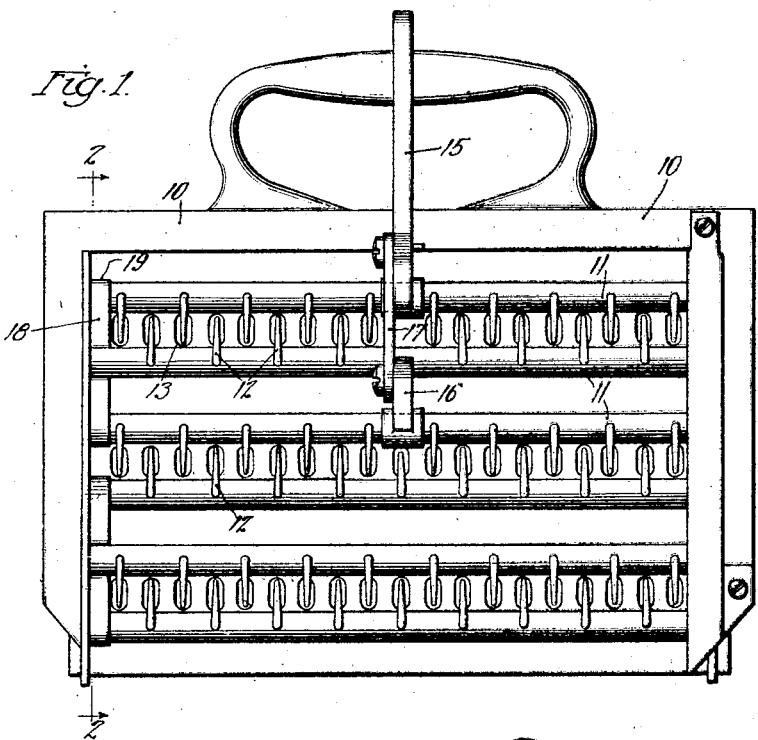
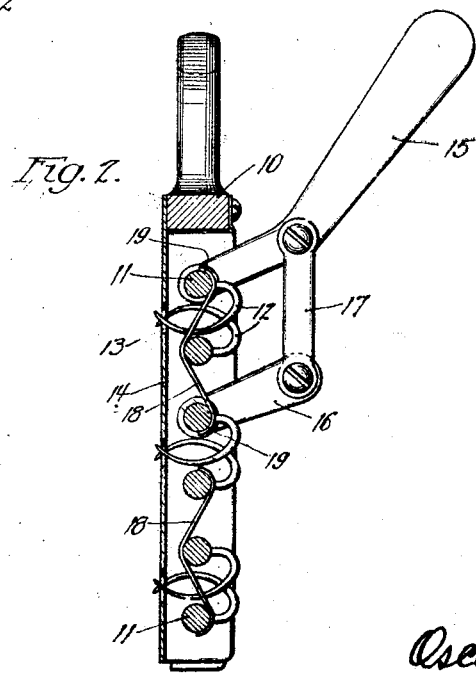
Inventor
Oscar Brownsey
By Nissen & Crane Attys.

Patented June 23, 1925.

1,543,317

UNITED STATES PATENT OFFICE.

OSCAR BROWNSEY, OF LAPORTE, INDIANA, ASSIGNOR TO U. S. SLICING MACHINE COMPANY, OF LAPORTE, INDIANA, A CORPORATION OF INDIANA.

HOLDER FOR SLICING MACHINES.

Application filed May 9, 1921. Serial No. 467,954.

*To all whom it may concern:*

Be it known that I, OSCAR BROWNSEY, a citizen of the United States, residing at Laporte, in the county of La Porte and State of Indiana, have invented certain new and useful Improvements in Holders for Slicing Machines, of which the following is a specification.

This invention relates to devices for holding material to be cut by slicing machines and especially to a holder for the meat ends to permit cutting the material to the last slice.

The invention has for its object the provision of a device of the class named which shall be of improved construction and operation. It is exemplified in the combination and arrangement of parts shown in the accompanying drawing and described in the following specification, and more particularly pointed out in the appended claims.

In the drawings,

Fig. 1 is a rear elevation of a holding device embodying one form of the present invention.

Fig. 2 is a section on the line 2—2 of Fig. 1.

This invention is applicable to a large variety of holders or last slice devices for slicing machines, and by way of illustration it is shown in the drawings as applied to a holder of the general type shown in Patent No. 1,356,165.

In the drawings, the numeral 10 designates a frame, which is held in an upright position on a slicing machine in a manner similar to that described in the patent referred to. Cross-bars 11 are pivoted between the side members of the frame 10, and are geared to rotate together in the manner shown in the patent referred to above. The bars 10 are provided with a series of holding pins or tines 12, which are projected through openings 13 in the face plate 14, so as to engage the face of the material to be held. The bars 11 are oscillated by a handle 15 connected with one of the bars 11, and a supplementary connection 16 and links 17 may be provided if desired.

It is very desirable in a device of this kind that the tines 12 shall be held against accidental projection through the openings 13. When the device is not in use, if the tines are accidentally projected their sharp points are liable to cause injury to persons or property, and when the device is on the machine if the tines are accidentally projected there is in some cases danger of injuring the cutting blade or the operator. It will be seen from Fig. 2 that the weight of the handle 15 tends to rotate the rods 11 in a direction to project the tines, and if the friction of the bearings is not sufficient to retain the handle 15 in its uppermost position the weight of the handle may project the tines through the openings 13. This is especially true after the device has become slightly worn so that the bearings are loose. To overcome this danger the present invention includes a friction member which may be in the form of a leaf spring 18, sprung into position to frictionally bear against three or more of the bars 11. A single spring may be interwoven back and forth so as to engage all of the bars on the holder, but in some cases it will be found preferable to use separate springs, each of which has a three-point bearing and cooperates with three bars only. It will also be seen that a friction device of this kind maintains a constant resistance to accidental rotation of the bars, but that it will not interfere with the movement of the bars under the operation of the handle 15. The springs 18 may be adjusted to regulate their pressure upon the bars 11 by changing the initial set or bend given to the springs. If it is found that not sufficient pressure is exerted on the bars, the springs may be removed and slightly straightened so as to exert greater pressure. Each spring is preferably given a hook-shaped bend at its end shown at 19, for preventing accidental displacement of the spring.

Other forms of frictional devices within the spirit and scope of this invention, which may be either resilient or adjustable or both as in the present case, will readily suggest themselves to those skilled in the art.

I claim:

1. In a device for holding material to be cut by a slicing machine, the combination with a support holding members arranged in spaced relation on said support and movable relative thereto, means for operating said members, and a yieldingly acting brake for preventing accidental operation of said members.

2. In a device for holding material to be cut by a slicing machine, the combination with holding tines arranged to be projected into and out of operating position, and means for retaining said tines in any position of adjustment.

3. In a device for holding material to be cut by slicing machines, the combination with pointed holding members arranged to be retracted to an inoperative position, and means for yieldingly retaining said members in retracted position without exerting a retractive force thereon.

4. In a holder for slicing machines, the combination with a plate, of pointed members for holding material against said plate, said members being movable into a retracted position in which their points are unexposed, and means for yieldingly retaining said members in their retracted position without operating to return said member to said position.

5. In a holder for slicing machines, the combination with a support material engaging prongs arranged in spaced relation on said support and movable relative thereto into and out of engaging position, and means for yieldingly and frictionally resisting accidental movement of said prongs.

6. In a holder for slicing machines, the combination with material engaging prongs movable into and out of engaging position, and frictional means for holding said prongs against accidental movement, said frictional means being adjustable to exert different amounts of frictional resistance to the movement of said prongs.

7. A material holder for slicing machines comprising a plate, holding prongs for securing material to said plate, said prongs being movable into and out of position to project beyond the face of said plate, a handle for operating said prongs, and a spring member for frictionally resisting movements of said handle and prongs.

8. A material holder for slicing machines comprising rotary bars having holding members thereon and operated thereby, and a spring brake member arranged to engage one of said bars to hold said bars against accidental rotation.

9. A holder for slicing machines comprising a plate having openings therethrough, a plurality of bars having pointed members thereon arranged to move through said openings into position to engage material to be held against said plate and into a retracted position in the rear of said plate, a handle for operating said bars, and a spring member arranged to engage a plurality of said bars to provide frictional resistance to movement thereof.

10. A material holder for slicing machines comprising a frame having a plurality of bars journaled for rotation therein, holding tines carried by said bars and movable thereby to clamp material to be sliced, and a plurality of spring members arranged to engage different ones of said bars and to provide frictional resistance to the operation of said bars.

11. A work holder for slicing machines comprising a frame having a plurality of bars journaled therein, a plate carried by said frame and having openings therethrough, tines connected with said bars, means for rotating said bars to project the pointed ends of said tines through said openings and into engagement with material to be sliced, and elongated springs interwoven between said bars so that each spring bears upon a plurality of said bars and provides frictional resistance against the rotation thereof to retain said tines in their various positions to which they have been moved.

12. A work holder for slicing machines comprising a frame, a plate carried by said frame and having a plurality of openings therethrough, rotary bars journaled in said frame in the rear of said plate, a plurality of tines carried by each of said bars and arranged to be projected through said openings to cause their pointed ends to enter material to be sliced, a handle for rotating said bars, and an elongated spring interwoven between a plurality of said bars and arranged to resist downward movement of said handle under the influence of gravity.

In testimony whereof I have signed my name to this specification on this 6th day of May, A. D. 1921.

OSCAR BROWNSEY.